United States Patent [19]

Preiner et al.

[11] Patent Number: 4,861,807
[45] Date of Patent: Aug. 29, 1989

[54] RADIATION-CROSSLINKABLE COMPOSITIONS

[75] Inventors: Gerhard Preiner, Burghausen; Friedrich Hockemeyer, Marktl; Christa Burger, Burghausen, all of Fed. Rep. of Germany

[73] Assignee: Wacker-Chemie GmbH, Munich, Fed. Rep. of Germany

[21] Appl. No.: 137,897

[22] Filed: Dec. 28, 1987

[30] Foreign Application Priority Data

Mar. 19, 1987 [DE] Fed. Rep. of Germany ....... 3708958

[51] Int. Cl.$^4$ .............................................. C08G 77/28
[52] U.S. Cl. ..................................... 522/99; 525/477; 528/30; 528/32
[58] Field of Search ...................... 528/30, 32; 522/99; 556/429; 525/477

[56] References Cited

U.S. PATENT DOCUMENTS

| | | | |
|---|---|---|---|
| 4,052,529 | 10/1977 | Bokerman et al. | 522/99 |
| 4,064,027 | 12/1977 | Gant | 528/30 |
| 4,571,349 | 2/1986 | Hockemeyer et al. | 522/99 |
| 4,595,471 | 6/1986 | Preiner et al. | 522/29 |

Primary Examiner—John C. Bleutge
Assistant Examiner—Ralph H. Dean, Jr.

[57] ABSTRACT

Compositions which may be crosslinked to form adhesive-repellent coatings having increased separation values, comprising organopolysiloxanes in which at least 95 mol percent of the siloxane units have the formula $$HR^1C=CR^2COOR^3SiR_2O_{\frac{1}{2}},$$

where R is a monovalent hydrocarbon radical or a halogenated monovalent hydrocarbon radical, $R^1$ is hydrogen or a halogenated phenyl radical, $R^2$ is hydrogen or an alkyl radical having from 1 to 4 carbon atoms, $R^3$ is a divalent hydrocarbon radical or a halogenated divalent hydrocarbon radical, in which the organopolysiloxanes also contain siloxane units of the formulas $$HSR^4SiRO \text{ and } R_2{}^5SiO$$

in which R is the same as above, $R^4$ is a divalent hydrocarbon radical, $R^5$ is the same as R or a hydrocarbon radical substituted with the $HR^1C=CR^2COO$ group, where $R^1$ and $R^2$ are the same as above, and at least 95 percent of the silicon-bonded oxygen atoms in the siloxane units having the HS group are present in the $\equiv$Si-OSi$\equiv$ group, and at least one organopolysiloxane having units of the formulas $$R_3{}^6SiO_{\frac{1}{2}} \text{ and } R^6SiO_{3/2} \text{ and/or } SiO_{4/2}$$

in which 0.5 to 50 percent of the $R^6$ radicals are those of the formula $$HSR^4-$$

where $R^4$ is the same as above and the remaining $R^6$ radicals are the same or different monovalent hydrocarbon radicals, halogenated monovalent hydrocarbon radicals or hydrocarbon radicals which are substituted by a group of the formula $HR^1C=CR^2COO-$, where $R^1$ and $R^2$ are the same as above.

3 Claims, No Drawings

RADIATION-CROSSLINKABLE COMPOSITIONS

The present invention relates to organopolysiloxane compositions, particularly to organopolysiloxane compositions which are crosslinked by irradiation and more particularly to crosslinked organopolysiloxane compositions which may be used as adhesive repellent coatings having improved separation values.

BACKGROUND OF THE INVENTION

Compositions which are crosslinked by irradiation have been disclosed heretofore for preparing coatings which repel tacky substances. Hockemeyer, for example, describes in U.S. Pat. No. 4,571,349, organopolysiloxane compositions which are crosslinked by high energy radiation to form coatings consisting of siloxane units of the formulas:
(a) $HR^1C = CR^2COOR^3SiR_2O_{\frac{1}{2}}$;
(b) $HSR^4SiRO$; and
(c) $R_2{}^5SiO$, where R is a monovalent hydrocarbon radical or a halogenated monovalent hydrocarbon radical, $R^1$ is hydrogen or a phenyl radical or a halogenated phenyl radical, $R^2$ is hydrogen or an alkyl radical having from 1 to 4 carbon atoms, $R^3$ is a hydrocarbon radical or a halogenated hydrocarbon radical, $R^4$ is a divalent hydrocarbon radical, $R^5$ is the same as R or a hydrocarbon radical substituted with the $HR^1C = CR^2COO$ group, where $R^1$ and $R^2$ are the same as above, in which two siloxane units of the formula $HR^1C = CR^2COOR^3SiR_2O_{\frac{1}{2}}$ are present per molecule.

U.S. Pat. No. 4,064,027 to Gant describes a composition which is curable upon exposure to ultraviolet light consisting of a siloxane consisting of (A) vinyl-containing siloxane units of the formula $$(CH_2=CH)R_nSiO_{\frac{3-n}{2}},$$

where R is a monovalent hydrocarbon radical or a halogenated monovalent hydrocarbon radical and n has a value from 0 to 2, (B) a siloxane containing at least one silicon-bonded hydrogen atom, and (C) a cure accelerator having the formula $$[(HS)_pR''']_qR''''_vSiO_{\frac{4-q-v}{2}}$$

where $R'''$ is a divalent or trivalent hydrocarbon radical, one bond of which is attached to the silicon atom and the other bonds are attached to the mercapto groups, p has a value of 1 when $R'''$ is divalent and a value of 2 when $R'''$ is trivalent, q has a value of 1 or 2, $R''''$ is a monovalent hydrocarbon radical, v is from 0 to 2 and the sum of q and v is from 1 to 3, L any other siloxane units present in (C) having the general formula $$Q_tSiO_{\frac{4-t}{2}},$$

where Q is a monovalent or halogenated monovalent hydrocarbon radical and t has a value of from 0 to 3.

Even though organopolysiloxanes containing units of the formulas $$R_3{}^6SiO_{\frac{1}{2}} \text{ and}$$

$$R^6SiO_{3/2},$$

where $R^6$ is a radical of the formula $HSR^4-$, or a monovalent or halogenated monovalent hydrocarbon radical or a hydrocarbon substituted by a group of the formula $HR^1C=CR^2COO$, where $R^1$ is hydrogen or a halogenated phenyl radical, $R^2$ is hydrogen or an alkyl radical having from 1 to 4 carbon atoms per radical and $R^4$ is a divalent hydrocarbon radical, are described in the patent to Gant, it does not disclose organopolysiloxanes containing units of the formulas $$HR^1C=CR^2COOR^3R_2SiO_{\frac{1}{2}},$$

$$HSR^4SiRO \text{ and}$$

$$R_2{}^5SiO,$$

where R, $R^1$, $R^2$, $R^3$, $R^4$ and $R^5$ are the same as above.

Moreover, Gant does not disclose that compositions containing organopolysiloxanes made from units of the formulas $$R_3{}^6SiO_{\frac{1}{2}} \text{ and } R^6SiO_{3/2},$$

where $R^6$ is the same as above, can increase the separation value.

It is an object of the present invention to provide compositions which are crosslinked when exposed to a radiation source. Another object of the present invention is to provide compositions which crosslink rapidly upon exposure to a radiation source. Another object of the present invention is to provide compositions which can be crosslinked to form coatings which have adhesive-repellent properties. Still another object of the present invention is to provide coatings having an increased separation value. Still another object of the present invention is to provide coatings in which the improved separation value remains constant even after storage. A further object of the present invention is to provide coatings having predetermined separation values that remain substantially constant. A still further object of the present invention is to provide compositions which are substantially free of unpleasant odors.

SUMMARY OF THE INVENTION

The foregoing objects and others which will become apparent from the following description are accomplished in accordance with this invention, generally speaking, by providing radiation-crosslinkable compositions which may be used in adhesive-repellent coatings comprising an organopolysiloxane having at least 95 mole percent of siloxane units of the formula $$HR^1C=CR^2COOR^3R_2SiO_{\frac{1}{2}}$$

in which R is a monovalent hydrocarbon radical, or a halogenated monovalent hydrocarbon radical, $R^1$ is hydrogen or a halogenated phenyl radical, $R^2$ is hydrogen or an alkyl radical having from 1 to 4 carbon atoms per radical, and $R^3$ is a divalent hydrocarbon radical or a halogenated divalent hydrocarbon radical, and also contains siloxane units of the formulas $$HSR^4SiRO \text{ and } R_2{}^5SiO$$

in which R is the same as above, $R^4$ is a divalent hydrocarbon radical, $R^5$ is the same as R or is a hydrocarbon radical which is substituted by a group of the formula $HR^1C=CR^2COO$, where $R^1$ and $R^2$ are the same as above, and at least 95 percent of the silicon-bonded oxygen atoms in the siloxane units having the HS group are present in the $\equiv SiOSi\equiv$ group, in which the compositions also contain, in addition to the organopolysiloxane defined above, at least one organopolysiloxane having units of the formulas $R_3^6SiO_{\frac{1}{2}}$ and $R^6SiO_{3/2}$ and/or $SiO_{4/2}$, in which 0.5 to 50 percent of the $R^6$ radicals are those of the formulas $HSR^4$—, where $R^4$ is the same as above, while the remaining $R^6$ radicals are the same as $R^5$.

DESCRIPTION OF THE INVENTION

Even though organopolysiloxanes containing units of the formulas $R_3^6SiO_{\frac{1}{2}}$ and $R^6SiO_{3/2}$ are described in U.S. Pat. No. 4,064,027, the patent does not disclose organopolysiloxanes which contain units of the formulas $HR^1C=CR^2COOR^3R_2SiO_{\frac{1}{2}}$, $HSR^4SiRO$ and $R_2^5SiO$.

In addition, U.S. Pat. No. 4,064,027 does not disclose that coating compositions containing organopolysiloxanes having units of the formulas $R_3^6SiO_{\frac{1}{2}}$ and $R^6SiO_{3/2}$ have an increased separation value.

The organopolysiloxane compositions of the present invention which contain siloxane units of the formulas $HR^1C=CR^2COOR^3R_2SiO_{\frac{1}{2}}$, $HSR^4SiRO$ and $R_2^5SiO$, where R, $R^1$, $R^2$, $R^3$, $R^4$ and $R^5$ are the same as above, preferably have a viscosity of from 50 to 10,000 mPa.s at 25° C.

Examples of hydrocarbon radicals represented by R and $R^5$ are alkyl radicals having from 1 to 18 carbon atoms per radical, such as the methyl, ethyl, n-propyl, isopropyl, n-butyl, sect-butyl, 2-ethylhexyl and octadecyl radicals; cycloalkyl radicals having from 5 to 8 carbon atoms per radical, such as the cyclohexyl, cycloheptyl and methylcyclohexyl radicals; hydrocarbon radicals having aliphatic double-bonds and from 2 to 18 carbon atoms per radical, such as the vinyl and allyl radicals; aryl radicals having from 6 to 12 carbon atoms per radical, such as the phenyl and xenyl radicals; alkaryl radicals having 7 to 18 carbon atoms per radical, such as the tolyl radicals; and aralkyl radicals having from 7 to 18 carbon atoms per radical, such as the benzyl and betaphenylethyl radicals.

Examples of halogenated hydrocarbon radicals represented by R and $R^5$ are the 3-chloropropyl, 3,3,3-trifluoropropyl o-, p- and m-chlorophenyl radicals.

The $R^1$ radical is preferably hydrogen, while examples of halogenated phenyl radicals are the o-, m- and p-chlorophenyl radicals.

Likewise, the $R^2$ radical is also preferably hydrogen, while the most important example of an alkyl radical represented by $R^2$ is the methyl radical.

The $R^3$ radical is preferably a radical of the formula $-(CH_2)_p-$ where p is an integer having a value of from 1 to 6, generally from 2 to 6, and more particularly 3. However, $R^3$ may also be a branched alkylene radical, such as a radical of the formula $-CH_2C(CH_3)_2CH_2-$, arylene radicals, such as the phenylene radical, alkarylene radicals, such as radicals of the formula $-(CH_2)_2C_6H_4-$ or aralkylene radicals, such as radicals of the formula $-C_6H_4(CH_3)-$. Examples of halogenated radicals represented by $R^3$ are the o-, p- and m-chlorophenylene radicals.

The examples of hydrocarbon radicals represented by $R^3$ are equally applicable to the $R^4$ radicals, where the radical of the formula $-(CH_2)_3-$ is again especially preferred due to its availability.

The most important example of a hydrocarbon radical represented by $R^5$ which is substituted by the $HR^1C=CR^2COO-$ group is a radical of the formula $H_2C=CHCOO(CH_2)_3-$.

Preferably, at least 95 percent of the R and $R^5$ radicals are methyl radicals.

Preferably, from 1 to 30, and more preferably from 2 to 10 units of the formula $HSR^4SiRO$ and from 10 to 1,000, and more preferably from 50 to 300 units of the formula $R_2^5SiO$ are present per molecule.

The ratio of the units of the formula $HSR^4SiRO$ to the units of the formula $R_2^5SiO$ is preferably 1:1000 to 1:1, and more preferably from 1:100 to 1:30.

The preferred organopolysiloxanes containing units of the formulas $HR^1C=CR^2COOR^3R_2SiO_{\frac{1}{2}}$, $HSR^4SiRO$ and $R_2^5SiO$ can be represented by the formula $H_2C=CHCOO(CH_2)_pSiR_2O\ SiR[(CH_2)_3SH]O_m(SiR_2\text{-}^5O)_nSiR_2(CH_2)_pOOCCH=CH_2$ in which R, $R^5$ and p are the same as above, m is an integer having a value of from 1 to 30, preferably from 2 to 10, and n is an integer having a value of from 10 to 1,000, preferably from 50 to 300, and the ratio of m:n is 1:1000 to 1:1, and more preferably from 1:100 to 1:30.

Although these are not generally represented by the formulas above, up to 5 mole percent of siloxane units other than the siloxane units specified herein may be present, generally as impurities, such as units of the formulas $RSiO_{3/2}$, in which R is the same as above, or $SiO_{4/2}$.

The organopolysiloxanes containing units of the formulas $HR^1C=CR^2COOR^3R_2SiO_{\frac{1}{2}}$, $HSR^4SiRO$ and $R_2^5SiO$ can be prepared, for example, by equilibrating in a known manner, organo(poly)siloxanes of the formula $H_2C=CHCOO(CH_2)_pSiR_2O(SiR_2^5O)_xSiR_2(CH_2\text{-})_pOOCCH=CH_2$ in which R, $R^5$ and p are the same as above, and x is 0 or an integer having a value of from 1 to 1000, with a linear organo(poly)siloxane of the formula $HOSiR[(CH_2)_3SH]O_m(R_2^5O)_xH$ in which $R^5$, m and x are the same as above, or a cyclic organopolysiloxane obtained from units of the formula $SiR[(CH_2)_3SH]O$ and, if appropriate, units of the formula $$SiR_2^5O,$$

where R and $R^5$ are the same as above, and the total number of siloxane units in such a cyclic organopolysiloxane is from 3 to 6 per molecule, and, if appropriate, a linear or cyclic organo(poly)siloxane of the formula $$HO(SiR_2^5O)_nH \text{ or } (SiR_2^5O)_q, \text{ respectively,}$$

in which $R^5$ and n are the same as above, and q is an integer having a value of from 3 to 6.

In the process, the reactants are preferably employed in an amount of from 0.5 to 15 HS groups, and in particular from 1 to 5 HS group(s), per acryloxy group.

The number of $SiR_2^5O$ units in the reactants corresponds to the m:n ratio desired in the final product.

In the equilibration described above, the catalysts are preferably acid catalysts. Examples of such catalysts which promote equilibration are hydrochloric acid, sulfuric acid, phosphoric acid, trifluoromethanesulfonic acid and phosphonitrile dichlorides, and acid catalysts which are solid under the reaction conditions, such as acid-activated bleaching earth, acidic zeolites, sulfonated charcoal and sulfonated styrene-di-vinylbenzene copolymer. Phosphonitrile chlorides are the preferred acid catalysts. If phosphonitrile chlorides are employed as catalysts in the equilibration described above, then preferably an amount of from 5 to 1,000 ppm by weight (parts per million), and more preferably from 50 to 200 ppm by weight, based on the total weight of the organosilicon compounds are employed.

In order to accelerate the equilibration, the mixture can be warmed to from 70° to 150° C. The equilibration is preferably carried out in from 5 to 20 percent by weight, based on the total weight of the organosilicon compounds employed, of a water-immiscible solvent, such as toluene, in order to prevent premature crosslinking of the reaction product and to simplify discharge of the water formed during the reaction.

The equilibration is preferably carried out at atmospheric pressure, i.e., at 1020 hPa (abs.), or about 1020 hPa (abs.); however, if desired, higher or lower pressures can also be used.

After the equilibration is complete, the catalyst can be deactivated, for example by adding trioctylamine or triisononylamine, particularly when phosphonitrile chlorides are used as equilibration catalysts.

It is possible to use one type of organopolysiloxane containing units of the formula $$HR^1C=CR^2COOR^3R_2SiO_{\frac{1}{2}},$$

$$HSR^4SiRO \text{ and } R_2^5SiO;$$

however, it is also possible to use mixtures of at least two different types of such organopolysiloxanes.

The organopolysiloxanes containing units of the formulas $$R_3^6SiO_{\frac{1}{2}} \text{ and } R^6SiO_{3/2} \text{ or } SiO_{4/2} \text{ or } R^6SiO_{3/2} \text{ and } SiO_{4/2}$$

preferably have a viscosity of from 100 to 5,000 mPa.s at 25° C.

The examples of hydrocarbon radicals represented by R and $R^5$ also apply to the hydrocarbon radicals represented by $R^6$. The examples of halogenated hydrocarbon radicals represented by R and $R^5$ likewise apply to the halogenated hydrocarbon radicals represented by $R^6$. An example of a hydrocarbon radical represented by $R^6$ which is substituted by the $HR^1C=CR^2COO-$ group is a radical of the formula $$H_2C=CHCOO(CH_2)_3-.$$

A further example of such a substituted hydrocarbon radical is the gamma-methacryloxypropyl radical.

The preferred $R^6$ radical having the formula $HSR^4-$ is a radical of the formula $HS(CH_2)_3-$, though the above mentioned examples of divalent hydrocarbon radicals represented by $R^3$ also apply to the hydrocarbon radicals represented by $R^4$ in the $R^6$ radicals represented by the formula $HSR^4$.

The radicals of the formula $HSR^4-$ may be present in units of the formula $R_3^6SiO_{\frac{1}{2}}$ or $R^6SiO_{3/2}$ or in both types of these siloxane units.

Preferably from 1 to 10 percent of the $R^6$ radicals are radicals of the formula $HSR^4-$, especially radicals of the formula $HS(CH_2)_3-$, and the remaining $R^6$ radicals are preferably methyl radicals.

The organopolysiloxanes made from units of the formulas $R_3^6SiO_{\frac{1}{2}}$ and $R^6SiO_{3/2}$ or $SiO_{4/2}$ or $R^6SiO_{3/2}$ and $SiO_{4/2}$ preferably contain from 10 to 500 units of the formula $R_3^6SiO_{\frac{1}{2}}$ and a total of from 10 to 500 units of the formulas $R^6SiO_{3/2}$ and $SiO_{4/2}$ per molecule.

It is further preferred that the ratio of the units of the formula $R_3^6SiO_{\frac{1}{2}}$ to the total number of units of the formulas $R^6SiO_{3/2}$ and $SiO_{4/2}$ be from 100:1 to 1:10.

The organopolysiloxanes containing units of the formulas $R_3^6SiO_{\frac{1}{2}}$ and $R^6SiO_{3/2}$ and/or $SiO_{4/2}$ can be prepared in a manner which is well known in the art, such as for example, by reacting a silane of the formula $$R^5Si(OR^7)_3$$

in which $R^5$ is the same as above, and $R^7$ represents the same or different alkyl radicals having from 1 to 4 carbon atoms per radical, such as a methyltrimethoxysilane, with a silane of the formula $$R^8Si(OR^7)_3$$

in which $R^7$ is the same as above and $R^8$ represents a radical of the formula $HSR^4-$, where $R^4$ is the same as above, such as a gamma-mercaptopropyltrimethoxysilane, and/or with a silane of the formula $Si(OR^7)_4$, where $R^7$ is the same as above, such as a tetraethoxysilane, a disiloxane of the formula $R_3^5SiOSiR_3^5$, where $R^5$ is the same as above, such as a hexamethyldisiloxane, and water in the presence of a catalyst, such as concentrated hydrochloric acid, and also, if appropriate, a water-miscible solvent, which is inert towards the reactants, such as ethanol.

The catalyst can also be deactivated, for example, by adding calcium carbonate, before working up the mixture obtained from the equilibration.

It is possible to use only one type of organopolysiloxane made from units of the formulas $R_3^6SiO_{\frac{1}{2}}$ and $R^6SiO_{3/2}$; however, it is possible to use a mixture consisting of at least two different types of such organopolysiloxanes.

Instead of an organopolysiloxane made from units of the formulas $R_3^6SiO_{\frac{1}{2}}$ and $R^6SiO_{3/2}$, or mixed with such an organopolysiloxane, it is possible to use only one type of organopolysiloxane made from units of the formulas $R_3^6SiO_{\frac{1}{2}}$ and $SiO_{4/2}$, or a mixture of at least two different types of these organopolysiloxanes.

Instead of an organopolysiloxane made from units of the formulas $$R_3^6SiO_{\frac{1}{2}} \text{ and } R^6SiO_{3/2} \text{ or } SiO_{4/2}$$

or mixed with such an organopolysiloxane, it is possible to use one type of organopolysiloxane made from units of the formulas $$R_3^6SiO_{\frac{1}{2}}, R^6SiO_{3/2} \text{ and } SiO_{4/2}$$

or a mixture of at least two different types of these organopolysiloxanes.

The organopolysiloxanes obtained from units of the formulas $R_3^6SiO_{\frac{1}{2}}$ and $R^6SiO_{3/2}$ and/or $SiO_{4/2}$ are preferably essentially free of groups, such as hydroxyl or alkoxy groups, which are bonded directly to the silicon atoms.

The compositions of this invention preferably contain an organopolysiloxane having units of the formulas $R_3^6SiO_{\frac{1}{2}}$ and $R^6SiO_{3/2}$ and/or $SiO_{4/2}$ in an amount of from 1 to 1,00 percent by weight, based on the weight of the organopolysiloxanes containing units of the formulas $$HR^1C=CR^2COOR^3R_2SiO_{\frac{1}{2}}, HSR^4SiRO \text{ and } R_2SSiO.$$

The higher the proportion of the organopolysiloxanes containing units of the formulas $R_3^6SiO_{\frac{1}{2}}$ and $R^6SiO_{3/2}$ and/or $SiO_{4/2}$ the higher the separation value of the coatings prepared from this mixture.

The radiation-crosslinkable compositions of this invention can be used where it is desired to prepare adhesive-repellent coatings with a separation value which is greater than the separation value of adhesive-repellent coatings where no attempt has been made to increase the separation value, such as backings for paper coated with a pressure-sensitive adhesive, for example stickers, including price labels, or for coating the sides of paper with a pressure sensitive adhesive which have not been coated with an adhesive.

The surfaces to which the compositions of this invention can be applied in order to prepare adhesive-repellent coatings can be, for example, paper, plastic films, such as polyethylene films or polypropylene films, or polyethylene-coated kraft paper. The polyethylene can be high-, medium- or low-pressure polyethylene. The paper can be low-grade types of paper, such as sorptive papers, including raw kraft paper, i.e., kraft paper which has not been pretreated with chemicals and/or natural polymers, having a weight of from 60 to 150 g/m², unsized papers, papers having a low degree of beating, woody papers, nonsatinized or noncalendered papers, papers which, through use of a calender stack during their production, are smooth on one side without further expensive measures and can, therefore, be called "one-side machine-finished papers", uncoated papers or papers produced from waste paper or recycled paper. Of course, however, the paper to be treated with the compositions of this invention may also be high-grade types of paper, such as low-absorption papers, sized papers, papers having a high degree of beating, wood-free papers, calendered or satinized papers, cellophane, glassine paper, parchmented papers or pre-coated papers.

The compositions of this invention can be applied to the surfaces to be coated in any of several ways which are suitable for preparing coatings from liquid substances, such as for example, by dipping, brush-coating, pouring, spraying, rolling-on, printing, for example by using an offset gravure coating device, or coating with a knife or with a hand coater, including those using a Meyer rod or using an air brush. If the coating is applied by means of an offset gravure coating device, the substrate having the surface to be coated can be transported at a higher speed than the engraved cylinder.

During the application of the compositions of this invention onto the surfaces to be coated, the compositions may, if appropriate, be dissolved in a solvent or be present in an emulsion, including an aqueous emulsion. However, it is preferred that no solvents or other diluents be present.

The compositions of this invention are preferably crosslinked by irradiating with ultraviolet light. However, the irradiation may also take place, for example, using electron beams, gamma beams, X-rays, light having a wavelength of 400 to 600 nanometers, i.e., so-called "halogen light", or using at least two different types of such beams.

In the case of irradiation with electron beams, 1 to 4 MRad are sufficient.

In the case of ultraviolet light, a light having a wavelength in the range of from 200 to 400 nanometers is preferred. It can be produced, for example, in xenon, low-pressure mercury, medium-pressure mercury or high-pressure mercury lamps. If the compositions of this invention are to be crosslinked by irradiation with ultraviolet light or socalled "halogen light" or both beams, they must contain at least one photoinitiator. The photoinitiators, which may be employed may be any photoinitiators which have been or could have been present in light-crosslinkable compositions. Examples of suitable photoinitiators are anthraquinone and substituted anthraquinones, such as chloroanthraquinone; benzophenone and substituted benzophenones, such as hydroxybenzophenones, 2,4-bis-(trimethylsiloxy)-benzophenone, 4-methylbenzophenone, 4-chlorobenzophenone, 4,4'-dimethoxybenzophenone and 4-chloro-4'-benzylbenzophenone; xanthone and substituted xanthones, such as 3-chloroxanthone, 3,9-dichloroxanthone and 3-chloro-8-nonylxanthone; acetophenone and substituted acetophenones, such as 2-hydroxy-2-methyl-1-1-phenylpropan-1-one, trichlorobutylacetophenone, 3-methylacetophenone, 4-methylacetophenone and 3-bromoacetophenone; benzoin and substituted benzoins, such as benzoin alkyl ethers, for example, benzoin methyl ether, benzoins in which the hydrogen atom of the benzoin hydroxyl group is replaced by a silicon atom of a cyclic organopolysiloxane, such as described in German Patent Application No. 3,123,676, (Shin-Etsu Chemical Co., Ltd.), and benzoin derivatives which are obtained from the reaction of, for example, benzoin with, for example, a halogen bonded directly to silicon in the presence of triethanolamine, an acid which is more acidic than benzoin and a base which is more basic than triethanolamine; thioxanthone and substituted thioxanthones; benzil and substituted benzils, such as benzil ketals; fluorenone and substituted fluorenones. In addition to the examples of the photoinitiators mentioned above, the following may be mentioned as examples of other specific photoinitiators: mesityl oxide, propiophenone, benzaldehye, carbazole and Michler's ketone.

Preferably, the photoinitiators are soluble in the compositions of this invention. This can easily be determined by simple experiments.

If the compositions of this invention contain a photoinitiator, then preferably the photoinitiator is present in an amount of from 0.5 to 2 percent by weight, based on the total weight of the organopolysiloxanes.

In addition to organopolysiloxanes, and if necessary a photoinitiator, the compositions of this invention may also contain additional substances. Examples of such additional substances are, in particular, agents to improve the adhesion of the coating on the substrates on which they have been applied, such as gamma-mercaptopropyltrimethoxysilane, butanediol diacrylates and gamma-glycidoxypropyltriacetoxysilane.

In the following examples, all parts and percentages are by weight, unless otherwise specified.

EXAMPLE 1

(a) A mixture containing 410.4 g of a mixed hydrolyzate consisting of 29 mols of dimethyldichlorosilane and 1 mol of gamma-mercaptopropylmethyldimethoxysilane having a Si-bonded hydroxyl group in each of the terminal units, 60 g of an organopolysiloxane of the formula

$H_2C=CHCOO(CH_2)_3Si(CH_3)_2O[Si(CH_3)_2O]_9$-$Si(CH_3)_2(CH_2)_3OOCHC=CH_2$, 444 g of a dimethylpolysiloxane which has one Si-bonded hydroxyl group in each of the terminal units and which has an average of 100 Si atoms per molecule, and 150 g of toluene mixed with 0.36 ml of a 15 percent solution of phosphonitrile chlorides in methylene chloride is refluxed for 2 hours. The water formed during the reaction is collected in a Dean-Stark trap. The catalyst is deactivated using 0.5 g of triisononylamine, and the resultant solution is filtered with the aid of activated charcoal and diatomaceous earth. The components which boil up to 80° C. at 100 Pa (abs.) are distilled from the solution. About 825 g (90 percent of theory) of a clear, colorless oil are recovered, which has a viscosity of 800 mPa.s at 25° C. The nuclear magnetic resonance spectrum shows that the colorless oil contains 230 dimethylsiloxane units and 8 $[HS(CH_2)_3]CH_3SiO$ units per molecule in addition to the terminal gamma-acryloxypropyldimethylsiloxane units.

(b) About 51 kg of a mixture containing 29.5 percent (830 mols) of water, 61 percent (674 mols) of ethanol and 9.5 percent (51 mols) of concentrated hydrochloric acid are added to a mixture containing 91.5 kg (514 mols) of methyltrimethoxysilane, 10.1 kg (51.5 mols) of gamma-mercaptopropyltrimethoxysilane and 15.3 kg (94.4 mols) of hexamethyldisiloxane over a period of about one hour. When the addition is complete, the resultant mixture is refluxed for 1 hour at 80° C. The mixture obtained after refluxing is mixed with 10 kg (94.6 mols) of sodium carbonate with agitation, and then filtered through a layer of sodium sulfate. The components which boil up to 60° C. at 133 Pa (abs.) are removed from the filtrate by distillation. About 58.5 kg (83.9 percent of theory) of a slightly turbid, colorless oil are recovered having a viscosity of 560 mPa.s at 25° C.

(c) About 50 parts of the organopolysiloxane whose preparation is described in (b) above are mixed with 100 parts of the organopolysiloxane whose preparation is described in (a) above, 4 parts of 2-hydroxy-2-methyl-1-phenyl-propan-1-one and 4 parts of gamma-mercaptopropyltrimethoxysilane.

The resultant mixture is applied by means of a glass rod to kraft paper satinized on both sides. The mixture applied to the paper is crosslinked within 0.5 second using a medium-pressure mercury ultraviolet lamp having a power of 80 watts/cm of the lamp length and a maximum power of 366 nanometers at a distance of 10 cm from the paper to form an abrasion-resistant coating.

Test values in accordance with FINAT 10 and 11, published in "Suppliers and Users Technical Manual", June 1980, pages 21 to 24, using a commercially available pressure-sensitive, 2.5 cm-broad adhesive tape ("Tesafilm rot No. 154", Beiersdorf AG, Hamburg, FRG; the word "Tesa" at least is a registered trademark) and a commercially available hot-melt adhesive:

|  | Adhesive Tape | Hot-melt Adhesive |
| --- | --- | --- |
| Separation value, cN/cm | 26.8 | 13.2 |
| Residual adhesive force | 85% | — |

These values are also unchanged after storage of the coated paper for 4 weeks at 30° C.

Comparison Example

The procedure described in Example 1(c) above is repeated, except that the organopolysiloxane prepared in accordance with Example 1(b) is omitted.

Test values, determined as specified in Example 1:

|  | Adhesive Tape | Hot-melt Adhesive |
| --- | --- | --- |
| Separation, value, cN/cm | 14.2 | 4.5 |
| Residual adhesive force | 91% | — |

The increase in separation value achieved through the additive of this invention is 89 percent in the case of adhesive tape and 193 percent in the case of the hot-melt adhesive.

EXAMPLE 2

(a) A mixture containing 100 g of water, 200 g of ethanol and 10 g of concentrated hydrochloric acid is added dropwise to a mixture containing 147 g of gamma-mercaptopropyldimethylethoxysilane, 170 g of hexamethyldisiloxane and 416 g of tetraethoxysilane over a period of about one hour. The resultant mixture is stirred for 1 hour at 110° C. and at atmospheric pressure (about 1000 hPa/abs.), while the components which boil under these conditions are allowed to distill off. The mixture is then neutralized with calcium carbonate and filtered. The components which boil up to 30° C. and at 2 hPa (abs.) are removed from the filtrate by distillation using a rotary evaporator. About 421 g (93 percent of theory) of a clear, colorless, oil are recovered having a viscosity of about 350 mPa.s at 25° C.

(b) The procedure described in Example 1(c) above is repeated, except that 50 parts of the organopolysiloxane prepared in accordance with Example 2(a) above are substituted for the 50 parts of the organopolysiloxane prepared in accordance with Example 1(b) above, and 50 parts of the organopolysiloxane prepared in Example

|  | Adhesive Tape | Hot-melt Adhesive |
|---|---|---|
| Separation value, cN/cm | 45.8 | 19.8 |
| Residual adhesive force | 83.6% | — |

What is claimed is:

1. A radiation-crosslinkable organopolysiloxane composition for preparing adhesive-repellent coatings containing an organopolysiloxane in which at least 95 mole percent of the siloxane units are those of the formulas $$HR^1C=CR^2COOR^3R_2SiO_{\frac{1}{2}}, HSR^4SiRO \text{ and } R^5_2SiO$$

in which R is selected from the group consisting of a monovalent hydrocarbon radical and a halogenated monovalent hydrocarbon radical, $R^1$ is selected from the group consisting of hydrogen and a halogenated phenyl radical, $R^2$ is selected from the group consisting of hydrogen and an alkyl radical having from 1 to 4 carbon atoms per radical, and $R^3$ is selected from the group consisting of a divalent hydrocarbon radical and a halogenated divalent hydrocarbon radical, $R^4$ is a divalent hydrocarbon radical, $R^5$ is selected from the group consisting of R and a hydrocarbon radical which is substituted by a group of the formula $HR^1C=CR^2COO—$, in which $R^1$ and $R^2$ are the same as above and at least 95 percent of the silicon-bonded oxygen atoms in the siloxane units having the HS group are present in the $\equiv SiOSi\equiv$ group, and at least one organopolysiloxane having units selected from the group consisting of the formulas (i) $R^6_3SiO_{\frac{1}{2}}$ and $R^6SiO_{3/2}$,
(ii) $R^6_3SiO_{\frac{1}{2}}$ and $SiO_{4/2}$,
(iii) $R^6_3SiO_{\frac{1}{2}}$, $R^6SiO_{3/2}$ and $SiO_{4/2}$, and
(iv) mixtures thereof, in which 0.5 to 50 percent of the $R^6$ radicals are those of the formula $$HSR^4—$$

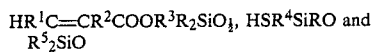, and the remaining $R^6$ radicals are the same as $R^5$.

2. The composition of claim 1, wherein from 1 to 10 percent of the $R^6$ radicals are radicals of the formula $$HSR^4—,$$

where $R^4$ is a divalent hydrocarbon radical.

3. The composition of claims 1 or 2, wherein 10 to 500 units of the formula $$R^6_3SiO_{\frac{1}{2}}$$

and a total of 10 to 500 units of the formulas $$R^6SiO_{3/2} \text{ and } SiO_{4/2}$$

are present in the organopolysiloxanes obtaind from units selected from the group consisting of the formulas
(i) $R^6_3SiO_{\frac{1}{2}}$ and $R^6SiO_{3/2}$
(ii) $R^6_3SiO_{\frac{1}{2}}$ and $SiO_{4/2}$
(iii) $R^6_3SiO_{\frac{1}{2}}$, $R^6SiO_{3/2}$ and $SiO_{4/2}$ and
(iv) mixtures thereof,
and the ratio of the units of the formula $$R^6_3SiO_{\frac{1}{2}}$$

to the total number of units of the formulas $$R^6SiO_{3/2} \text{ and } SiO_{4/2}$$

is 100:1 to 1:10, where $R^6$ is selected from the group consisting of a radical of the formula $$HSR^4— \text{ and } R^5,$$

where $R^4$ is a divalent hydrocarbon radical and $R^5$ is selected from the group consisting of R and a radical which is substituted by a group of the formula $$HR^1C=CR^2COO—,$$

where R is selected from the group consisting of a monovalent hydrocarbon radical and a halogenated monovalent hydrocarbon radical, $R^1$ is selected from the group consisting of hydrogen, a halogenated phenyl radical and $R^2$ is selected from the group consisting of hydrogen and an alkyl radical having from 1 to 4 carbon atoms per molecule.

* * * * *